No. 828,988. PATENTED AUG. 21, 1906.
B. M. VOORHEES.
HARROW ATTACHMENT.
APPLICATION FILED SEPT. 6, 1905.
2 SHEETS—SHEET 2.
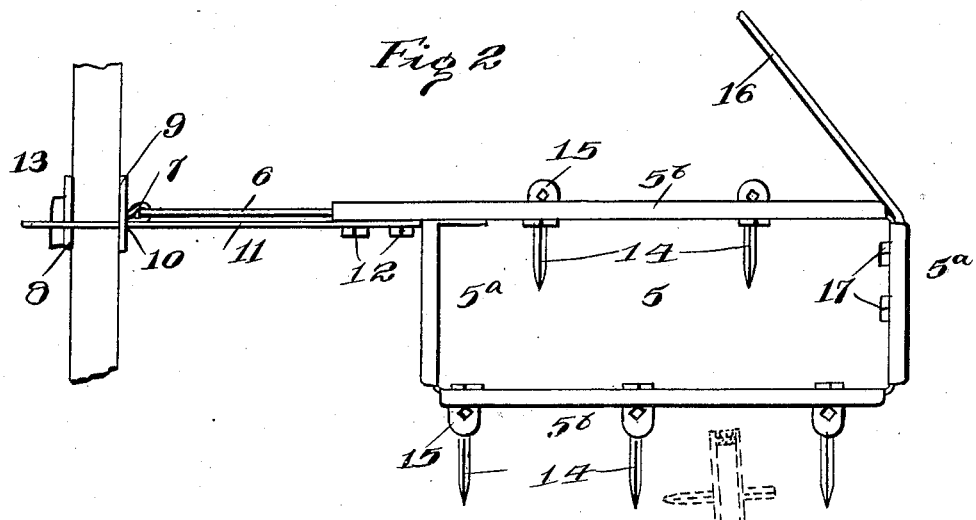
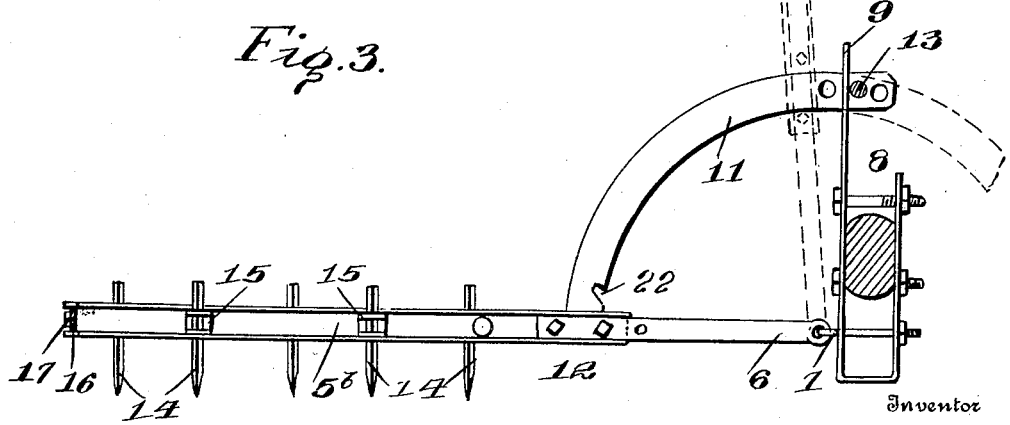
Inventor
B. M. Voorhees

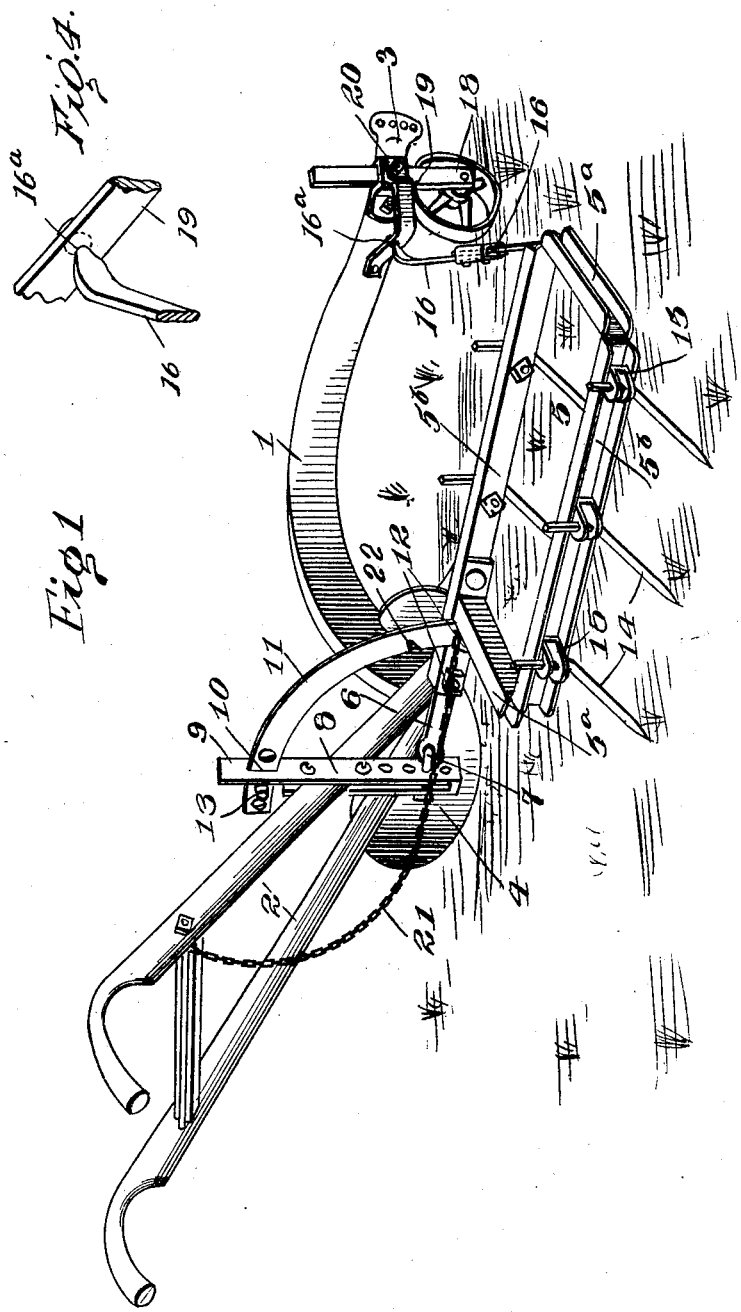

UNITED STATES PATENT OFFICE.

BELMONT M. VOORHEES, OF RUSHVILLE, NEW YORK, ASSIGNOR OF ONE-FOURTH TO STANLEY E. VOORHEES, OF RUSHVILLE, NEW YORK.

HARROW ATTACHMENT.

No. 828,988.          Specification of Letters Patent.          Patented Aug. 21, 1906.

Application filed September 6, 1905. Serial No. 277,224.

*To all whom it may concern:*

Be it known that I, BELMONT M. VOORHEES, a citizen of the United States, residing at Rushville, in the county of Yates and State of New York, have invented certain new and useful Improvements in Harrow Attachments, of which the following is a specification.

This invention aims to provide a new and practical improvement in harrow attachments of that type particularly designed for attachment to plows of any of the common forms at present in use.

The construction of the harrow attachment is such as to admit of arrangement for right or left hand harrowing, so that one-half of the previously-turned furrow and one-half of the furrow being turned may be thoroughly leveled and reduced or pulverized.

A further object of the invention resides in the peculiar manner of attaching the same to the plow whereby the side draft is overcome, not necessitating extra labor on the part of the plowman or draft-animal.

For a full description of the invention and the merits thereof and also to acquire a knowledge of the details of construction of the means for effecting the result reference is to be had to the following description and accompanying drawings, in which—

Figure 1 is a perspective view of a harrow attachment embodying the invention applied to a common plow. Fig. 2 is a top plan view of the attachment alone. Fig. 3 is a section showing the harrow-frame in raised position in dotted lines. Fig. 4 is a detail perspective view of a portion of the draft-bar and illustrates its swiveled connection.

Corresponding and like parts are referred to in the following description and indicated in all the views of the drawings by the same reference characters.

Referring to the drawings, the plow shown therein embodies a beam 1, handles 2, at the rear end of the beam, a clevis 3, a share, and a moldboard 4. The attachment comprising the invention consists of a frame 5, which latter is made of somewhat rectangular form, preferably including the side bars $5^a$ and the front and rear bars $5^b$. The front bar $5^b$ is extended laterally some distance beyond one of the side bars $5^a$ and is connected, by means of an adjustable rod 6, to an eyebolt 7, swiveled to a clamp 8, attached to a side portion of the plow. The clamp 8 consists of spaced members and is preferably secured to one of the handles 2 of the plow, being arranged vertically thereon. One of the side members of the clamp 8 is extended upwardly beyond the other side member, as shown at 9, and the extension is formed with a slot 10, through which the upper end of a brace 11 passes. The brace 11 is connected at its lower end, as shown at 12, with the lateral extension of the front bar $5^b$ of the frame 5, and the upper end portion of the brace is provided with a plurality of openings to receive a pin 13, which pin, though permitting free upward movement of the brace through the slot 10, limits the downward movement of the frame 5 by engagement with the outer side of the upwardly-projecting portion 9 of the clamp 8. In other words, the pin 13 holds the frame 5 at a predetermined adjustment above the ground, and the provision of the openings in the upper end of the brace 11 admits of adjustment of the pin 13 to vary the position of the frame 5, which carries the harrow-teeth 14. The frame 5 thus has a pivotal and swivel connection with the clamp 8 by the provision of the eyebolt 7 and the rod 6, the latter having adjustable connection with the front bar of the frame 5.

The frame 5 is preferably made of angle-iron of U shape in cross-section, and small clamp-plates 15 are disposed against the outer sides of the frame having openings to receive the upper portions or shanks of the teeth 14. The clamp-plates 15 are secured to the frame 5 by means of clamp-bolts which cause a clamping action of the teeth 14 against the frame-bars to position the latter and prevent displacement thereof. Either straight or inclined teeth may be employed upon the frame 5, as desired, and the form and mounting of said teeth may be varied, according as found necessary and dependent upon working conditions. The frame 5 is not only connected with the side portion of the plow, but said frame is also connected with the front end portion of the beam 1 by means of a draft-bar 16. The bar 16 is secured to the outer side bar $5^a$ of the frame 5 by means of suitable fastenings 17. The bar 16 extends forwardly and inwardly from the outer portion of the frame 5, and the front end of said bar has a swiveled and universaljoint connection, as shown at 16ª, with an attaching-plate 19, secured to the beam 1 and to a clamp 20 of any suitable form. The clamp 20 is bolted to the beam 1, preferably securing a wheel-post thereto. The wheel-post is designated 18. The manner of attaching the frame 5 to a plow secures advantageous results which have been before touched upon, and it will be noted that the frame is adapted for free upward movement should the teeth carried thereby strike an obstruction. Further, the frame 5 is adapted to be operated so as to be elevated when necessary, and for this purpose it is designed to provide a chain or cord 21 or similar operating means connected with the lower portion of the brace 11 and having its upper portion arranged near the handle grasped by the plowman, so that the plowman may readily pull upwardly upon the connection 21, and thereby raise the frame 5. The brace 11 is provided with a notch 22, which is designed for engagement with one wheel of the opening 10 in the upward extension 9 of the clamp 8 when the harrow-frame is raised, thereby locking said frame in raised position.

The draw-bar 16 is preferably made in sections which are secured together by means of a clamp 20. The clamp 20 admits of adjustment of the sections of the draw-bar, so that the same may be readily applied to plows, the beams of which may be readily applied to plows having beams of different lengths.

Having thus described the invention, what is claimed as new is—

1. In combination with a plow, a harrow attachment comprising a harrow-frame, a clamp applied to a handle of the plow, an adjustable connection between the harrow-frame and said clamp, and a brace attached to the harrow-frame and movably connected with the clamp, as specified.

2. A harrow attachment for plows comprising a clamp designed for attachment to a handle of the plow, a harrow-frame pivotally connected to said clamp, a brace secured to said harrow-frame, and means for adjustably securing said brace to the clamp whereby the harrow-frame may be supported at different elevations, the said means permitting the free upward movement of the harrow-frame, and limiting the downward movement thereof.

3. A harrow attachment for plows comprising a clamp designed to be attached to the handle of the plow, a harrow-frame pivotally connected to said clamp, a brace connected at one end to the harrow-frame and provided at its other end with means adjustably secured thereto and designed to abut against the rear face of the clamp whereby to limit the downward movement of the brace and harrow-frame and permit the free upward movement thereof.

4. A harrow attachment for plows comprising a clamp designed to be applied to a handle of the plow, a harrow-frame pivotally connected to said clamp, the latter being provided with a slot, and a brace connected to said harrow-frame and passing through the slot in the clamp and provided with a series of apertures, and a pin designed for reception in any one of said apertures and arranged to abut against one face of said clamp whereby to limit the downward movement of the harrow-frame but permit the free upward movement thereof.

5. A harrow attachment for plows comprising a clamp designed for attachment to a handle of the plow and provided at its lower end with a vertically-extending series of apertures, a harrow-frame, a pivotal connection for said frame mounted in any one of said apertures in the clamp, a brace secured to said frame and means for adjustably connecting the upper end of said brace to the clamp.

6. A harrow attachment for plows comprising a clamp designed for attachment to a handle of the plow, a frame pivotally connected to said clamp, and a brace mounted for adjustable connection to said clamp and provided near the harrow-frame with a notch, as and for the purpose set forth.

In testimony whereof I affix my signature in presence of two witnesses.

BELMONT M. VOORHEES. [L. S.]

Witnesses:
 STANLEY E. VOORHEES,
 ALFRED SQUIER.